HUGH D. McGOVERN.
Sun Shield for Horses.
No. 5,456.
Reissued June 17, 1873.
Figure. I.
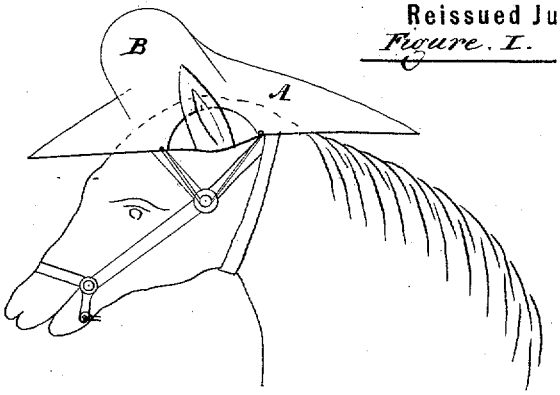
Figure. II.
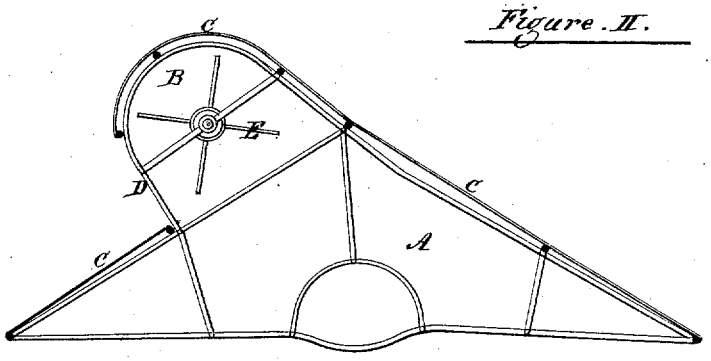
Witnesses.
H. E. Robinson.
J. Christian
Inventor.
Hugh D. McGovern
per Henry E. Roeder
attorney
AM. PHOTO-LITHOGRAPHIC CO. N.Y. (OSBORNE'S PROCESS.)

UNITED STATES PATENT OFFICE.

HUGH D. McGOVERN, OF BROOKLYN, NEW YORK.

IMPROVEMENT IN SUN-SHIELDS FOR HORSES.

Specification forming part of Letters Patent No. 120,208, dated October 24, 1871; reissue No. 5,456, dated June 17, 1873; application filed May 24, 1873.

*To all whom it may concern:*

Be it known that I, HUGH D. McGOVERN, of Brooklyn, New York, have invented certain Improvements in Sun-Shields or Bonnets for Horses, of which the following is a specification:

This invention relates to improvemnets in sun-shields or bonnets for horses, such as are intended and are capable of being supported above the animal's head, for the purpose of protecting and shielding the top portion from the heat and rays of the sun, the beneficial effects resulting from the employment of such devices being so apparent that it is not deemed essential to enter into any further details as to their peculiar office. My invention consists, first, in providing a sun-shield, such as is capable of being supported above a horse's head, with an elevated portion, in which is made, or is left during the process of manufacture, an opening or aperture for the passage of a current of air; and, second, in arranging said aperture in respect to the under side of the said top portion, and to an extended or projecting front end, that currents of air are free to pass through said opening and made to traverse the intervening space between the shield and top of the horse's head, thus not only protecting the said top portion or poll of the head from the sun's rays, but imparting a cooling effect to the same by the continuous passage of currents of air. The invention further consists in combining a rotating fan with a sun-shield for horses. Said fan is arranged beneath the under side of the top portion of the shield, and in such respect to the opening or entrance for air that the air-currents in their passage are interrupted or arrested and impelled or projected directly upon the top portion of the animal's head, and at the same time the fan aids in expelling the hot air arising from the animal's head. The invention further consists in forming that portion of the frame-work which is below the point where the air is introduced or enters with an inclined top surface, so that currents of air coming in contact with such surface are deflected and driven through the opening into the sun-shield, and, by impinging the under side of the top wall of the said shield, are impelled directly upon the top portion of the animal's head and thus exert a continuous cooling action.

In the accompanying drawing, Figure 1 is a view of improved sun-shield or bonnet supported in position above an animal's head; and Fig. 2 is a longitudinal section of the shield or bonnet, illustrating the projecting front edge, rotating fan, and elevated top portion.

The letter A designates the frame-work of the sun-shield or bonnet, it being wrought from such material as will support the covering material B, and retain the same in an extended state, in the present instance the frame-work being constructed of flexible material *a a*, which will yield when subjected to pressure, and when released resume its former normal shape. The frame-work is constructed so as to produce a cap or an elevated top portion, C, and an extended projecting front, D, the top of which is inclined from the front to the rear, for a purpose hereinafter mentioned. Within the front portion of the cap or elevated top is formed an opening or aperture, E, through which currents of air are introduced or pass, and which traverse the space intervening between the top portion of the horse's head and the under side of the top wall of the sun-shade or bonnet, by which the upper portion of the head of the horse is protected and shielded from the sun's rays; and, further, the same is subjected to the continuous currents of air entering at the front opening and escaping at the sides and in the rear of the shade. The extended or projecting front D of the shield or bonnet is inclined on its top surface from the front to the rear, or to its terminus or junction with the lower part of the opening E, the essential object of such being that as the shield is moved forward, as is the case when supported above a horse's head, the wave or currents of air will be deflected upward upon the inclined surface, and thus an increased volume or bulk of air will be made to pass through the opening E into and through the space intervening between the sun-shade and the top portion of the horse's head, the result being that all heated air arising from the head of the horse is expelled, and a continuous cooling effect produced while the animal is moving. The wave or currents of air directly after their passage through the opening E will, to some extent, impinge upon the under side of the top of the shield, and, by their velocity and the resistance of the covering of the shield, be impelled and projected backward and downward upon the top portion of the head of the horse, though it is evident that the major portion of the air-currents will traverse the entire intervening space and escape at the rear end of the shield. In connection with the cap or the elevated top portion of the shield or bonnet is arranged a rotating fan, F, which is journaled in suitable bearings, said rotating fan being actuated by the motion of the horse, or by currents of air coming in contact with it; the object of the fan being to arrest or interrupt the wave or currents of air entering at the front of the shield in their passage in the space intervening between the shield and the horse's head, and direct and project the same immediately upon the top portion of the horse's head, and thus exert a cooling effect upon the upper portion of the horse's head, while nicely shaded and protected by the shield; and, further, the said rotating fan aids the incoming currents of air in expelling all heated air arising from the top portion of the horse's head.

I claim as my invention—

1. A sun-shield for horses, constructed with an opening in the top thereof, for the purpose specified.

2. In combination with a sun-shield for horses, a rotating fan suspended within the shield for acting upon currents of air or heated air, substantially as described.

3. A sun-shield for horses, provided with a projecting front end having an inclined top surface for deflecting and conducting currents of air into the space between the shield and the upper portion of the horse's head, substantially as and for the purpose described.

4. A shield or horse-bonnet, A, provided with an elevated part or cap, B, having an aperture, D, on the front, in combination with a fan, F, placed in the cap B, substantially as and for the purpose described.

5. A sun-shield for horses provided with a raised portion for the purpose of facilitating the entry of a current of air, substantially as specified.

To the above specification I have signed my name this 4th day of February, A. D. 1873.

H. D. McGOVERN.

Witnesses:

ROBERT B. THOMPSON,

F. W. HANDFORD.